July 21, 1964 J. K. LYON, JR 3,141,659
ADJUSTABLE SHOCK ABSORBER SYSTEM FOR VEHICLES
Filed Dec. 7, 1959 2 Sheets-Sheet 1
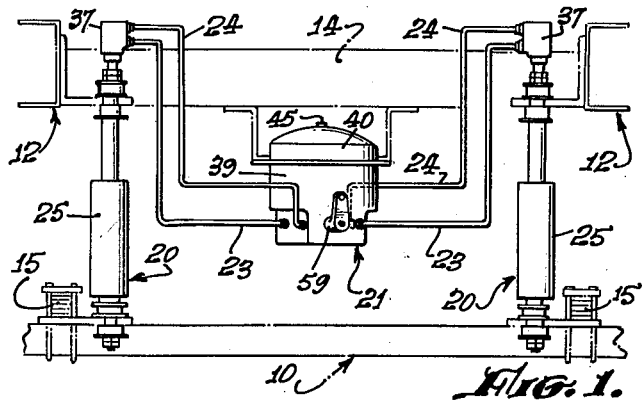
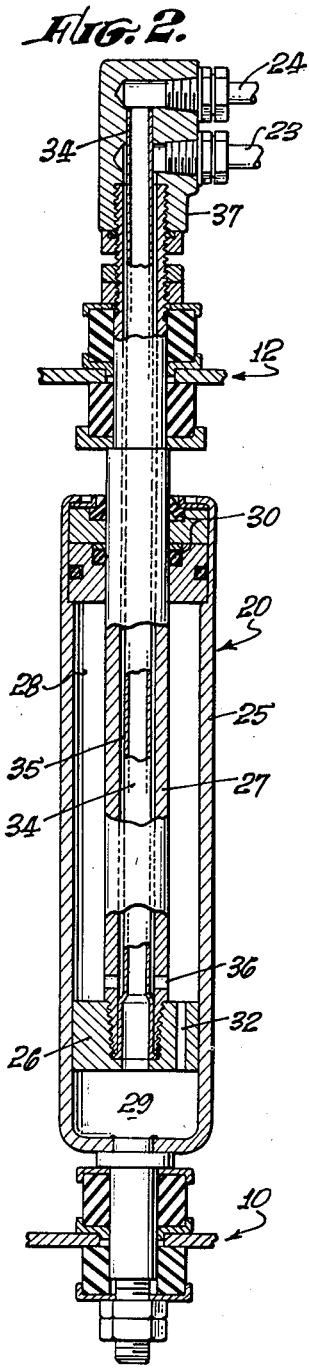
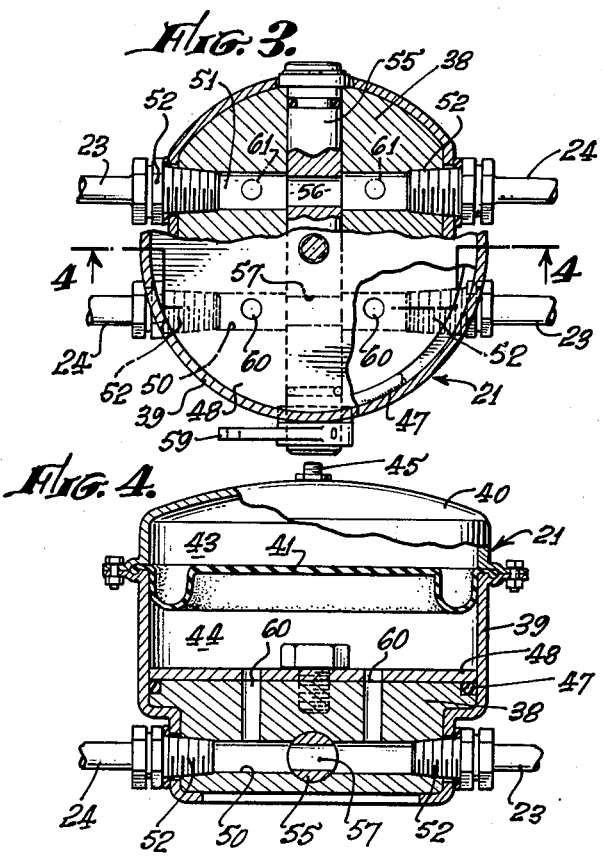
JOHN K. LYON, Jr.
INVENTOR.
BY
Knight & Rodgers
ATTORNEYS.

July 21, 1964   J. K. LYON, JR   3,141,659
ADJUSTABLE SHOCK ABSORBER SYSTEM FOR VEHICLES
Filed Dec. 7, 1959   2 Sheets-Sheet 2

JOHN K. LYON, Jr.
INVENTOR.

BY
ATTORNEYS.

United States Patent Office 3,141,659
Patented July 21, 1964

3,141,659
ADJUSTABLE SHOCK ABSORBER SYSTEM
FOR VEHICLES
John K. Lyon, Jr., 1176 Afton St., Pasadena, Calif.
Filed Dec. 7, 1959, Ser. No. 857,769
9 Claims. (Cl. 267—11)

The present invention relates generally to suspension systems for automotive vehicles, and more especially to hydraulic shock absorbers which can be adjusted at will in order to change the riding characteristics of the vehicle. The present invention has been particularly designed for use with pleasure-type automobiles, but it will be understood that in its broader aspect the invention is not limited to any particular type of vehicle.

It is old and well known to provide motor vehicles with springs interposed between the body and the wheels in order to absorb shocks imparted to the vehicle by unevenness in the road surface. The body and other elements of the vehicle which are supported on and by the springs are commonly referred to as the sprung mass, while the wheels and axles, and minor attached members, upon which the springs are supported are referred to as the unsprung mass. The purpose of the springs is to allow relative vertical movement between these two masses of the vehicle and to improve the riding or comfort characteristics of the vehicle.

If the springs are made relatively stiff and unyielding, the characteristics of the ride produced by them may be described as "hard." This is because the springs transmit to the body and to the people riding in it a relatively large proportion of the shock received from inequalities of the road surface. Consequently stiff springs are comfortable only when the road is comparatively smooth. The wide-spread and understandable demand for comfort by vehicle owners has resulted in most pleasure-type vehicles being originally equipped with springs which are comparatively flexible or yielding, the ride produced by such springs being described as "soft." Because of this more yielding nature of the springs, there is now much more relative movement between the wheels and the body; and as the amount of shock transmitted to the body is substantially decreased a greater degree of comfort results. It becomes necessary to control the rebound action of soft springs with shock absorbers which, after extreme initial compression of the springs, prevent the return or rebound movement from being too violent. Shock absorbers serve to damp the vibrations of the springs and thereby steady the body. The action of shock absorbers inevitably places some limitation upon the degree of comfort which can be obtained, although in other respects they improve the riding comfort by their damping action.

A high degree of riding comfort is usually secured at the expense of other valuable characteristics. Flexibility in springs reduces the degree of control that they exert over the position of the body and allows the body to tilt sideways when the vehicle turns, especially at sharp corners. Also they permit the body to dip down in front when the brakes are suddenly applied or to rise up in front under rapid acceleration. Excessive movement of the sprung mass with respect to the wheels of the vehicle can be very dangerous since it can produce skidding on turns and loss of control of the vehicle by the driver when traveling at high speeds, even on a straight road. As a result, it may be dangerous to drive a car having soft springs over a relatively rough road or around sharp corners, unless the speed of the vehicle is adequately reduced. Shock absorbers of conventional design can control this situation by stabilizing the position of the body over the wheels but do so at the expense of riding comfort, especially when the maximum degree of control exerted by the shock absorbers is not actually required for safety conditions.

Shock absorbers and springs operating as a system can be designed and engineered to meet satisfactorily a given set of conditions, for example, road roughness, vehicle loading, speed, and the like. However, they operate at their best within only a relatively narrow range of conditions and they do not have inherent flexibility to meet all conditions which may be encountered by many vehicles without some provision for adjustment in their operation. Various attempts have been made to improve the action of shock absorbers or ride stabilizing systems by providing some means for adjusting their operation. The general purpose has been to make a system which provides comfortable riding qualities at slow speeds and over smooth roads and yet which can be adjusted to effect an increase in the degree of control which is exercised over the body movement, when necessary. The result is of course an increase in the range of satisfactory operation of the suspension system since it can be adjusted to exert a higher degree of control when road conditions require that the comfort factor be ignored. Adjustable systems of known types have not been widely adopted on motor vehicles for various reasons. One obvious reason has been that many of them are relatively complicated and thus add considerably to the cost of the suspension system as compared to one without an adjustable characteristic. Other designs have not been especially reliable or have been difficult to maintain in satisfactory mechanical condition.

However, it is believed in general that the greatest shortcoming of known types of systems has been the relatively small benefit obtained from them, or, in other words, the relatively small range of variation of the ride characteristics which they are able to produce. While these shortcomings may be attributable in part to matters of engineering or mechanical design, it is believed that one of the largest factors has been a failure to appreciate the influence that the physical characteristics of the hydraulic fluid have on performance of a shock absorber system of this character.

In hydraulic shock absorbers which are capable of adjustment, this result is usually obtained by regulating the flow of fluid past or around the piston which travels in the shock absorber cylinder. Typically, it has been the practice to use a very light mineral oil as the fluid for this purpose. Such a fluid is entirely satisfactory in a non-adjustable shock absorber; but when used in an adjustable shock absorber system, it is not possible to realize the full benefits of adjustability. A light weight mineral oil of this character has a sufficiently high viscosity that it is not necessary to reduce mechanical tolerances to the point where manufacture of the shock absorbers becomes intolerably expensive. However, it is considered that this viscosity is too high to obtain the full benefits of adjustability in the ordinary system because the fluid does not have a sufficiently high degree of molibity or fluidity. The fluidity of the fluid is of course a maximum at summer temperatures and decreases with a drop in ambient temperature so that in cold winter weather there is a substantial difference in the performance in the same shock absorbers. While it might be considered obvious to overcome this problem by providing larger passages which represent less hindrance to fluid flow, it has been found that this is not a satisfactory answer. The larger passages require that a larger mass of fluid be accelerated and moved and this offsets the decrease in the flow resistance offered by the larger passages. Since a typical adjustable system includes conduits from the shock absorbers to an accumulator or the like, the length of these conduits is significant in the problem of fluid flow and increasing the size of these conduits does not solve other engineering problems. Especially is it not a substitute for a higher degree of fluidity.

It is a general object of my invention to provide a fluid-type shock absorbing and ride stabilizing system for an automotive vehicle or the like which includes means for adjusting quickly and effectively the degree of control exerted over the vehicle body by the system.

It is a further object of my invention to provide a fluid-type shock absorbing and ride stabilizing system of this character in which a change in the degree of control is effected by a single means which simultaneously regulates fluid flow with respect to a plurality of shock absorber units.

It is a further object of my invention to provide a shock absorbing ride stabilizing system of this character which is highly effective for the purpose intended and enables the driver to exert a wider degree of variation than heretofore possible in the control resulting from the system.

These advantages of my invention have been attained in a fluid-tight shock absorber system comprising an accumulator; a cylinder having a piston reciprocable within the cylinder and dividing the interior of the cylinder into two separate chambers each filled with hydraulic fluid and having passage means, either through the piston or around it, for transfer of fluid between the chambers at a restricted rate of flow; and separate conduit means connecting each cylinder chamber with the accumulator to reeive therein excess fluid from either chamber and to replenish each chamber independently of the other chamber. In such a system, I use a hydraulic fluid having a viscosity of not more than about 5 centipoises at 20° C., and preferably about 2–2.5 centipoises at 20° C. A suitable hydraulic fluid for this purpose is a petroleum distillate, preferably one having a boiling point in the range of 325°–575° F. This is approximately the boiling point range of the petroleum fraction commonly sold under the name "kerosene" and which is especially suitable for use as a hydraulic fluid in my improved shock absorber system; but at the same time it will be realized that other fluids may be suitable for this purpose.

How the above objects and advantages of my invention as well as others not specifically referred to herein, are attained will be more readily understood by reference to the following description and to the annexed drawing, in which:

FIG. 1 is a partly diagrammatic elevation of a shock absorber system constructed according to my invention, showing two cylinders on one axle connected by means of suitable conduits to a single accumulator.

FIG. 2 is a vertical median section through a typical design of shock absorber.

FIG. 3 is a horizontal section, with parts below the section broken away, through the lower portion of the accumulator.

FIG. 4 is a vertical section through the accumulator along line 4—4 of FIG. 3.

Figure 5:
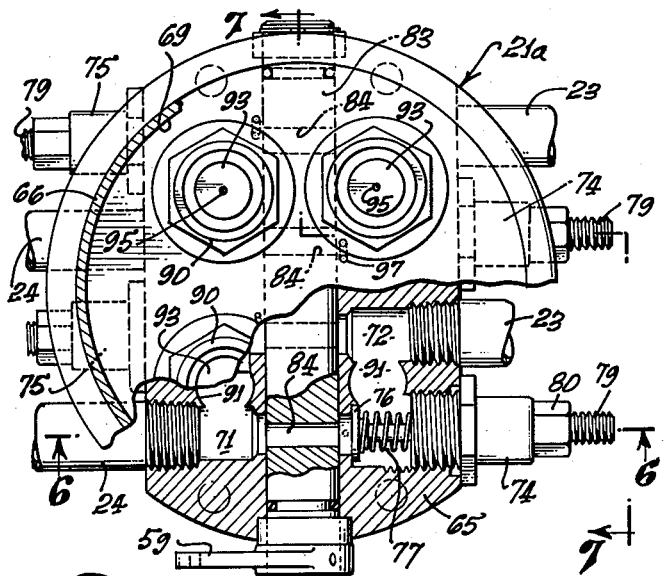
FIG. 5 is a horizontal section, generally similar to FIG. 3, of a variational form of accumulator.

The shock absorber and accumulator system illustrated in FIGS. 1–4 is disclosed and claimed broadly in my Patent No. 2,812,954 issued November 12, 1957, for "Ride Stabilizing System for Automobiles" to which reference may be made for a more detailed description. However, the system will be described here briefly in order to disclose a preferred system in which my improved hydraulic fluid may be used.

Referring now to FIG. 1, there is shown diagrammatically at 10 an axle of an automobile, for example the front axle, and at 12 there is indicated generally the frame of the vehicle, which includes a cross member 14. The wheels, not shown on the drawings, and the axle 10 on which they are mounted are included in the unsprung mass of the vehicle. The frame 12, with the body and other parts attached thereto, is supported by springs 15 on the axle; and they are included in the sprung mass of the vehicle. The shock absorbing or stabilizing system for the vehicle comprises a pair of shock absorbers indicated generally at 20 which are connected at their upper and lower ends with sprung and unsprung masses of the vehicle, respectively. Accumulator 21 is typically mounted on transverse frame member 14 and is connected to each of the shock absorbers by conduits 23 and 24, as indicated in FIGS. 1 and 2.

Each shock absorber is shown in greater detail in FIG. 2. Each one includes a cylinder 25 within which is a piston 26, the piston being reciprocable up and down within the cylinder and dividing the interior of the cylinder into an upper chamber 28 and a lower chamber 29. The cylinder is connected at its lower end to axle 10 in any suitable manner.

Piston 26 is connected to the lower end of hollow piston rod 27 which extends out of the upper end of cylinder 25 where a suitable packing 30 provides a fluid tight seal around the rod. The piston rod is attached by any suitable means to a portion of vehicle frame 12.

Piston 26 has a passage 32 which extends entirely through the piston and places upper chamber 28 in unobstructed communication with lower chamber 29, permitting transfer of fluid between the chambers, but at a restricted rate because of the relatively small size of passage 32. It is of course within the scope of my invention to use other means providing a passage permitting transfer of fluid between chambers 28 and 29. One such means would be a controlled annular clearance between the periphery of piston 26 and the inner surface of the wall of cylinder 25.

Piston rod 27 is hollow and has within it tube 34 which is of smaller outside diameter in order to provide an annular space 35 between piston rod 27 and tubing 34. Tubing 34 is hollow and open at its lower end to chamber 29. Annular space 35 is in communication with chamber 28 through one or more openings 36 in the wall of piston rod 27. Fitting 37 attached at the upper end of piston rod 27 is provided with a vertical bore through which inner tubing 34 extends and two transverse bores, one of which places conduit 24 in direct communication with the interior of tubing 34 and the other of which places conduit 23 in communication with annular space 35.

Accumulator 21 is here shown as being of the diaphragm type, although this feature is not necessarily limitative upon the invention. The accumulator is a hollow vessel comprising a base 38 upon which is a shell made in two parts 39 and 40. As shown in FIG. 4, the two portions 39 and 40 of the shell are made so that they can be bolted together and clamp between them the periphery of flexible diaphragm 41 which divides the interior space of the accumulator above base 38 into two compartments 43 above the diaphragm and 44 below.

Upper compartment 43 is filled with air or other elastic fluid at some pressure above atmospheric, it being found satisfactory to operate in the range of 20 to 50 p.s.i. Compartment 44 below diaphragm 41 is filled with a hydraulic fluid, the characteristics of which will be discussed later. Diaphragm 41 is preferably made of a material inert with respect to the air and the hydraulic fluid and serves as a means for separating these two fluid bodies. The diaphragm is not necessarily elastic but is flexible enough to move up and down in order to create a variation in the volumes of the two chambers. As a means for charging upper compartment 43 with air, shell section 40 is provided with an air valve 45 such as the familiar tire valve, or one of any other suitable design.

Base 38 is contained in the lower portion of shell section 39 and is preferably provided with packing 47 held in place by plate 48 in order to obtain a fluid-tight seal between the base and the walls of the shell. As may be seen by reference to FIGS. 3 and 4, there are two horizontal bores 50 and 51 parallel to each other which extend entirely through the base. The outer ends of these bores are threaded to receive nipples 52 by which conduits 23 and 24 are connected to the bores. It will be noted in FIG. 3 that conduits 23 and 24 from a single cylinder 20 are connected to corresponding ends of the two bores 51 and 50 respectively, while the conduits 23 and 24 from the two cylinders 20 at opposite sides of the vehicle are connected to opposite ends of each of bores 50 and 51. By this arrangement each upper cylinder chamber 28 is placed in direct communication through conduit 23, a bore 50 or 51 and conduit 24 of the other cylinder with the lower cylinder space 29 of the shock absorber at the opposite side of the vehicle.

The flow of hydraulic fluid from one shock absorber to the other through the accumulator base is regulated by means of valve mechanism which comprises rotary valve 55 which extends through the base to intersect both bores 50 and 51. Rotary valve 55 has a pair of spaced transverse passages 56 and 57 which are parallel to each other and which are so located that in one position of valve 55 passage 56 allows fluid to flow through bore 51 and passage 57 allows fluid to flow through bore 50, the latter being shown in FIG. 4. When valve 55 is rotated through an angle of 90° by means of lever 59 by valve operating mechanism not shown in the drawing, the two passages 56 and 57 are rotated to a position in which valve 55 shuts off communication between the opposite ends of both bores 50 and 51, thus simultaneously regulating flow in both bores.

Each of the two halves of the bores 50 and 51 is placed in communication with the lower chamber 44 of the accumulator containing hydraulic fluid. In the case of bore 50, this is accomplished by two vertical passages 60 located one on either side of rotary valve 55 and extending between bore 50 and chamber 44 through both base 38 and plate 48. A similar pair of bores indicated in broken lines at 61 in FIG. 3 place the two halves of bore 51 in communication with accumulator chamber 44. By means of the passages 60 and 61 the chambers of the shock absorbers are always in communication with the lower chamber of the accumulator. When flow directly through the two horizontal bores 50 and 51 is blocked by valve 55, fluid may still flow from either half of the bore into accumulator chamber 44 and then out into the other half of the bore using both the vertical passages 60 or 61. By this arrangement not only are the upper and lower chambers of each shock absorber placed in communication with each other so that excess liquid from the shock absorber may be transferred to the accumulator or a deficiency of liquid in the shock absorber supplied from the accumulator, but the chambers of the two shock absorbers on one axle are in communication with each other through the accumulator chamber 44.

Ordinarily two shock absorbers connected to a single axle are connected to one accumulator, a vehicle thus having two such systems. However, it is equally possible to have a separate accumulator for each shock absorber or a single accumulator for all shock absorbers on the vehicle.

Having described the construction of a simplified form of shock absorber system, the operation will now be described briefly. Assuming that valve 55 is in the open position in FIG. 4, there is direct communication between the two shock absorbers 20 at opposite ends of the axle 10. If a load is applied to one of the shock absorbers in the direction to cause piston 26 to descend within its cylinder, the movement of the piston causes displacement of hydraulic fluid from chamber 29. This displaced fluid may leave chamber 29 either through passage 32 to the upper chamber or through the interior of tube 34 to the accumulator. The descent of piston 26 causes a contraction in volume of chamber 29 and an increase in the volume of chamber 28. However, the lower chamber 29 contracts faster than the volume of chamber 28 expands because of the introduction into the upper chamber of a portion of piston rod 27. The difference in the change of volumes of the two chambers represents a minimum volume of excess liquid which is transferred out of the shock absorber. This volume of excess fluid may be transferred through the conduit means and the accumulator to the shock absorber at the opposite side of the vehicle, if the piston there is moving upwardly at the same time. However, it is more probable that the piston at the other side of the vehicle is stationary or is moving down simultaneously. Under these circumstances the excess fluid from either or both of the shock absorbers is transferred to lower chamber 44 of the accumulator.

Excess fluid can still be transferred from one shock absorber to the other as a net result of fluid movement when valve 55 is closed since fluid may flow out of accumulator chamber 44 through a passage 60 at the same time that it flows in. However a much greater resistance to such fluid flow is obtained when valve 55 is rotated to the closed position because flow is through passages 60 or 61.

On the rebound or upstroke of piston 26, flow conditions are generally similar to those described except that the direction of the fluid flow is reversed. However, one important difference is that the volume of the upper chamber 28 is contracting at a lesser rate than the volume of lower chamber 29 is expanding so that there is actually a deficiency of liquid in the shock absorber to fill the available volume for holding hydraulic fluid and this deficiency is supplied from the accumulator.

When moving in either direction very rapidly, the piston creates a zone of relatively low pressure at its retreating face. This condition is more pronounced on the upward than on the downward movement of the piston. Under certain pressure conditions within the shock absorber, cavitation results at the retreating face of the piston and there is an actual void created that is not filled by fluid. This condition is caused by the inability of the fluid to fill the expanding chamber fast enough to maintain contact with the piston. It is highly undesirable for several reasons. One of them is that it tends to draw air into the system which becomes dissolved in or emulsified with the hydraulic fluid and thereby destroys much of the effectiveness of the fluid. Also, when the direction of the piston is suddenly reversed at the end of its stroke, the piston is out of contact with the liquid at the face which is now advancing and it moves without restraint until it again strikes the liquid in the shock absorber. This produces a shock in the system which is distinctly undesirable. The unrestrained movement of the piston represents a short period of time when actually the shock absorber is failing to control the relative movement of the sprung and unsprung masses of the vehicle.

It is to avoid this effect of cavitation that I not only provide super-atmospheric pressure in upper chamber 43 of the accumulator but also prefer to use a hydraulic fluid having a particularly high degree of fluidity or mobility. It will be understood that, because of the need for transferring fluid through conduits 23 and 24 into and from the accumulator to the shock absorbers, the fluid must move at a very high velocity in order to conform to the rapid movements of the pistons in the shock absorbers. Consequently, I have found that it is desirable to have a highly mobile fluid; that is, one having a high degree of fluidity which is defined as the inverse of the characteristic known as viscosity. The common practice has been to use in ride stabilizing systems a fluid which has the same physical characteristics as the fluid normally used as shock absorbers alone, this being a very light mineral or machine oil. Although this oil seemingly has a satisfactory degree of fluidity, it has been demonstrated experimentally that the effect of a given system upon stabilizing the ride of a vehicle is much greater when a hydraulic fluid with a lesser viscosity is used in the system according to my invention.

I have found that the hydraulic fluid should have an absolute viscosity of less than about 5 centipoises at 20° C. and preferably a viscosity of about 2–2.5 centipoises. In order to obtain this degree of fluidity of the hydraulic fluid in the system, I prefer to use kerosene as the fluid filling the system. Kerosene is commonly defined as a petroleum distillate suitable for use as an illuminant in a wick lamp, this definition being used since the chemical composition of kerosene is not constant. It differs with the various types of petroleum from which the kerosene is distilled and also somewhat with the wishes or specification of the manufacturer. While kerosene generally has physical characteristics generally corresponding to tetradecane, of which kerosene contains a large amount, there are other constituents in commercial grades of kerosene. In order to define herein a preferred hydraulic fluid, the preferred fluid may be considered to be a petroleum distillate having a boiling point within the range of 325°–575° F., this being approximately the usual range between initial and final boiling points of the petroleum fraction which is referred to as kerosene.

Other liquids than kerosene may be used in the hydraulic fluid in the system above described. For example, other petroleum fractions may be used. Fractions such as naptha and gasoline have the desired degree of fluidity but are objectionable since they create some degree of fire hazard and are harder to effectively seal into the system. Likewise there are alcohols that have a fluidity within the desired range but they do not have as satisfactory lubricating properties in the system as a petroleum distillate and tend to make the piston bind in the cylinder unless the tolerance between these two members is increased accordingly. Leakage may then be excessive.

A relatively low viscosity at ordinary atmospheric temperatures is desired also because the viscosity is increased by all ordinary changes in operating conditions. For example a fluid with the viscosity of 2 centipoises at 20° C. may be expected in cold winter weather to increase in viscosity to 7 centipoises at −30° C. Also, the viscosity increases with pressures above atmospheric. While this increase is not great within a normal range of operating pressures, say under 20 atmospheres, at the same time the maximum increase occurs when pressure is applied to the system because of the result of piston movement and it is at this time that the lowest viscosity or most fluidity is desired for the hydraulic fluid.

Figure 6:
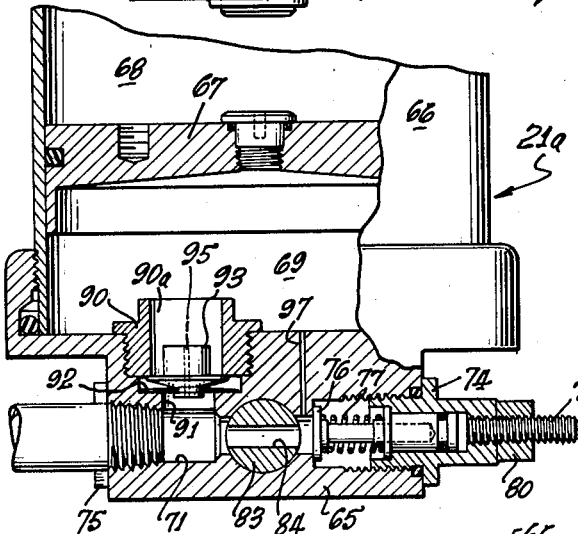
FIG. 6 is a fragmentary vertical section on line 6—6 of FIG. 5.
Figure 7:
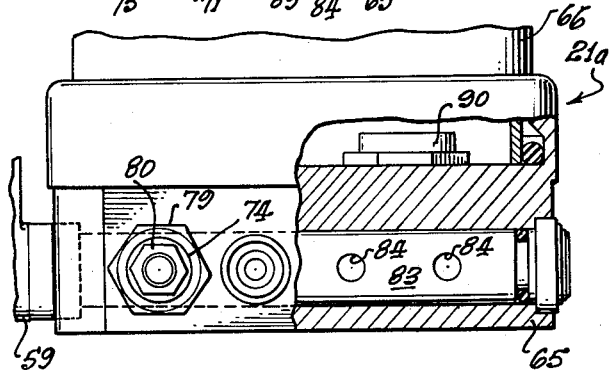
FIG. 7 is a fragmentary section taken on line 7—7 of FIG. 5.

The apparatus described above provides essentially two degrees of riding adjustment, that is with valve 55 either open or closed. Of course some variation can be obtained by moving valve 55 to an intermediate position. In order to obtain more degrees of adjustment or a different type of ride control, a more complex valve arrangement may be employed as illustrated in FIGS. 5, 6 and 7. In this variational embodiment of the invention the base of the accumulator is additionally provided with release and replenishing valves which regulate the fluid flow between the cylinders at opposite sides of the vehicle and also into and out of the accumulator.

Referring to FIG. 5 it will be seen that the accumulator 21a disclosed therein comprises a base 65 above which is mounted cylindrical shell 66. Within the shell is piston 67 which moves up and down within the shell and divides the interior space of the shell into an upper chamber 68 and a lower chamber 69. The upper chamber 68 is filled with air or other elastic fluid and the lower chamber 69 is filled with a suitable hydraulic fluid, as previously described. Movement of piston 67 up or down effects a change in the volumes of these two chambers.

Base 65 has four parallel horizontal bores extending through it. Two of these bores are indicated at 71 and 72 and comprise one cooperating pair. The other pair of bores are not shown in detail but are duplicates in every respect of the bores 71 and 72. One end of each of bores 71 and 72 is threaded to receive a conduit 24 or 23 respectively. The other end of each bore 71 and 72 is threaded to receive a plug 74 or 75 constituting the body of a relief valve. Each of these bores is counter-bored to provide a valve seat against which valve disc 76 of the relief valve is urged by spring 77 which bears at one end against the valve disc and at the other end against a stationary abutment carried in body 74 or 75. Each of the relief valves is a check-type valve normally urged to a closed position by the associated spring 77. Although entirely an optional feature, it is preferred to provide each of the valves with an adjustment screw 79 and a lock nut 80 by which the force exerted by spring 77 can be adjusted to any desired point within a given range.

A manually controlled rotary valve 83 is located in a transverse bore which intersects both bores 71 and 72 and also the other corresponding pair of bores. Rotary valve 83 is provided with a plurality of transverse passages 84. When in the horizontal position shown in FIGS. 5 and 6, passages 84 permit fluid flow directly through all the bores 71 and 72 and, if the fluid pressure is sufficiently great, past relief valve 76.

When rotated 90° from the position shown by lever 59, rotary valve 83 shuts off bores 71 and 72 to this straight through fluid flow. As is shown in FIG. 5, the accumulator base is provided with four replenishing valves. Each of these replenishing valves comprises a hollow valve body 90 threaded into an enlarged portion of a vertical pasasge 91. As shown best in FIG. 6, in each valve disc spring 92 urges the valve member 93 upwardly to bring an annular flange thereon against the underside of body 90 to prevent fluid flow upwardly through passage 91 and the central opening 90a in the valve body into lower accumulator chamber 69. Fluid flow in the reverse direction, that is downwardly from the accumulator chamber is permitted when the pressure differential is sufficient to open valve 93 downwardly against the force of spring 92.

It is preferred that a very restricted flow of hydraulic fluid be possible at all times through valve 93 and for this purpose each replenishing valve is provided with a small diameter by bore 95. This passage can be conveniently located in the body of valve member 93 but of course it may be located anywhere that is convenient.

Rather than having each bore 91 directly above a bore 71 or 72, these vertical passages are offset slightly to a position between a pair of bores 71 and 72 so that when drilled to a depth equal to the bottom of bores 71 and 72, a passage between the adjoining ends of a pair of bores 71 and 72 is provided as shown in FIG. 5.

Another optional feature that I prefer to include is by-pass 97 which extends vertically between lower chamber 69 and each of the passages 71 and 72, the by-pass communicating with each of the latter passages at a point between the manual valve 83 and relief valve 76, as shown in FIG. 6. Alternatively, the by-pass 97 may be provided at only passages 71 or only passages 72 to be effective on only a selected one of the compression or rebound strokes.

Having described the construction of the variational form of my invention, I shall now describe briefly its operation. Assuming that a piston 26 is descending in a shock absorber on a compression stroke, fluid may be forced out of that unit through conduit 24. Assuming valve 83 is open as shown, this excess fluid can flow into the accumulator chamber through either or both of passages 95 and 97. If the compression stroke raises the fluid pressure sufficiently to unseat 76 and open valve 74, then fluid can also travel through passage 84 and opening 91 into the adjacent bore 72 and then through conduit 23 to the other shock absorber 20. Opening valve 74 allows a greater rate of fluid transfer in order to meet the conditions existing when piston 26 descends suddenly on the compression stroke. On the rebound stroke flow conditions are reversed and a deficiency of fluid in the lower cylinder chamber 29 can be supplied by fluid flowing out of the lower accumulator chamber 69 through restricted passages 95 and 97. However, should this flow not be sufficient to keep the shock absorber filled, the pressure drop on the underside of replenishing valve 93 causes the valve to open against spring 92, which is a relatively light spring, and fluid can flow at a greater rate through valve passages 90a and 91 to passage 71 and conduit 24. If the pressure differential is such that fluid flows through conduit 23 into the shock absorber, the replenishing valve opening into horizontal passage 72 opens in order to provide fluid flow into conduit 23 and then to the shock absorber.

The relief valves result in a stiffer shock absorber action for small or slow movements of the sprung mass, but open to permit a rapid rate of fluid flow when movements are such as to raise the fluid pressure above the value at which the valves open.

A harder, stiffer ride with a greater degree of control over the full range of body movements can be obtained by closing valve 83. The change in operation is substantially the same as previously described since now the relief valves at 74 and 75 are rendered inoperative and by-pass 97 is cut off so that excess fluid from the shock absorber can flow into the accumulator only through passages 95 of the replenishing valves. On the other hand, the operation of the replenishing valves is not changed by closing manual valve 83 and they still open at a low pressure differential to supply any deficiency of fluid from the lower accumulator chamber.

Having described my invention and certain modifications thereof, it will be apparent that further variations will occur to persons skilled in the art without departing from the spirit and scope of my invention. Consequently, it is to be understood that the foregoing description is considered to be illustrative of rather than limitative upon, the appended claims.

I claim:

1. In a fluid-type shock-absorber and ride stabilizing system for a vehicle, the combination comprising:
   an accumulator;
   a cylinder spaced from the accumulator having a piston reciprocable within the cylinder and dividing the interior of the cylinder into two separate chambers each filled with hydraulic fluid;
   passage means extending between the two chambers for transfer of fluid between the chambers at a restricted rate of flow;
   separate conduit means connecting each cylinder chamber with the accumulator to receive excess fluid from either chamber and to replenish each chamber independently of the other chamber;
   and adjustable flow control means associated with the conduit means regulating flow of the hydraulic fluid between the cylinder and the accumulator;
   said fluid filling the system having an absolute viscosity of less than about 5 centipoises at 20° C.

2. A fluid-type shock-absorber and ride stabilizing system as in claim 1 in which the hydraulic fluid is a refined petroleum distillate.

3. A fluid-type shock-absorber and ride stabilizing system as in claim 1 in which the hydraulic fluid is a refined petroleum distillate having a boiling point in the range 325° F.–570° F.

4. In a fluid-type shock-absorber and ride stabilizing system for a vehicle, the combination comprising:
   a pair of spaced apart shock absorbers each comprising a cylinder having a piston reciprocable within the cylinder and dividing the interior of the cylinder into two separate chambers each filled with hydraulic fluid;
   passage means extending between the two chambers for transfer of fluid between the chambers at a restricted rate of flow;
   an accumulator located between and spaced from each of the shock absorbers;
   separate conduit means connecting each cylinder chamber with the accumulator to receive excess fluid from either chamber and to replenish each chamber independently of the other chamber;
   said conduit means also directly interconnecting the the upper chamber of each cylinder with the lower chamber of the other cylinder;
   and normally closed spring biased relief valve means at the accumulator preventing direct flow from each cylinder into the other cylinder at low pressure and opening in response to fluid pressure to permit direct fluid flow in the conduit means between cylinders when the fluid pressure in one chamber of one cylinder exceeds the fluid pressure in the other cylinder by a predetermined amount.

5. A fluid-type shock-absorber and ride stabilizer system as in claim 4 in which the hydraulic fluid has an absolute viscosity of less than about 5 centipoises at 20° C.

6. A fluid-type shock-absorber and ride stabilizing system as in claim 4 that also includes check-type replenishing valve means associated with each conduit controlling flow of fluid from each conduit into and out of the accumulator, said replenishing valve means permitting comparatively unrestricted flow out of the accumulator and highly restricted flow into the accumulator.

7. A fluid-type shock-absorber and ride stabilizing system as in claim 6 that also includes manually controlled valve means at the accumulator and upstream from the relief valves movable to a position to restrict flow from the cylinders toward the relief valves and to restrict direct flow of fluid between the two cylinders through the conduit means.

8. In combination: a pair of spaced, fluid-type shock-absorbers for a vehicle; conduit means interconnecting said shock-absorbers for fluid flow therebetween; adjustable flow control means in said conduit means regulating fluid flow between individual shock absorbers of a pair; and hydraulic fluid having an absolute viscosity of not more than about 5 centipoises at 20° C. within the shock-absorbers and the interconnecting conduit means.

9. In combination: a pair of spaced fluid-type shock-absorbers for a vehicle; conduit means interconnecting the shock-absorbers for a fluid flow therebetween; adjustable flow control means in said conduit means regulating fluid flow between individual shock absorbers of a pair; and hydraulic fluid, which is a refined petroleum distillate having a boiling point in the range of 325° F.–570° F., within the shock-absorbers and the conduit means.

References Cited in the file of this patent

UNITED STATES PATENTS

| | | |
|---|---|---|
| Re. 17,127 | Thompson | Nov. 6, 1928 |
| 1,455,691 | West | May 15, 1923 |
| 2,058,899 | Matheson | Oct. 27, 1936 |
| 2,199,108 | Loane et al. | Apr. 30, 1940 |
| 2,812,954 | Lyon | Nov. 12, 1957 |
| 2,828,138 | Brueder | Mar. 25, 1958 |